(12) United States Patent
Corsmeier

(10) Patent No.: US 10,670,178 B2
(45) Date of Patent: Jun. 2, 2020

(54) SLIP JOINT ASSEMBLY

(71) Applicant: General Electric Company, Schenectady, NY (US)

(72) Inventor: Donald Michael Corsmeier, West Chester, OH (US)

(73) Assignee: General Electric Company, Schenectady, NY (US)

( * ) Notice: Subject to any disclaimer, the term of this patent is extended or adjusted under 35 U.S.C. 154(b) by 443 days.

(21) Appl. No.: 15/491,056

(22) Filed: Apr. 19, 2017

(65) Prior Publication Data

US 2018/0306367 A1   Oct. 25, 2018

(51) Int. Cl.
| | | |
|---|---|---|
| *F16L 27/04* | (2006.01) | |
| *F16L 51/00* | (2006.01) | |
| *F04D 29/54* | (2006.01) | |
| *F16L 27/12* | (2006.01) | |

(52) U.S. Cl.
CPC ............ *F16L 51/00* (2013.01); *F04D 29/545* (2013.01); *F16L 27/04* (2013.01); *F16L 27/125* (2013.01)

(58) Field of Classification Search
CPC . F16L 27/04; F16L 27/06; F16L 27/02; F16L 27/023; F16L 27/026
USPC .................................... 285/145.3, 302, 145.2
See application file for complete search history.

(56) References Cited

U.S. PATENT DOCUMENTS

| | | | | |
|---|---|---|---|---|
| 407,671 | A | * | 7/1889 | Leland .................. F16L 27/026 285/145.3 |
| 1,034,965 | A | * | 8/1912 | Bradley ................. F16L 27/026 285/145.3 |
| 1,985,899 | A | | 1/1935 | Jahn |
| 2,175,550 | A | | 10/1939 | Neebe |
| 2,693,371 | A | * | 11/1954 | Nelson ..................... F16L 27/04 285/146.1 |
| 2,706,649 | A | | 4/1955 | Foushee, Jr. |
| 2,774,618 | A | | 12/1956 | Alderson |
| 3,066,889 | A | | 12/1962 | Kelly |
| 3,938,833 | A | * | 2/1976 | Miyaoka ............... F16L 27/026 285/146.2 |
| 3,945,573 | A | * | 3/1976 | Burgess ................... F16L 27/04 239/265.35 |
| 5,433,070 | A | | 7/1995 | Amelio |
| 5,740,839 | A | * | 4/1998 | Kuo ....................... F16L 27/026 285/145.3 |
| 6,092,360 | A | | 7/2000 | Hoag et al. |
| 6,257,625 | B1 | * | 7/2001 | Kitani ..................... F16L 27/026 285/145.3 |

(Continued)

FOREIGN PATENT DOCUMENTS

| | | | | | |
|---|---|---|---|---|---|
| DE | | 3241750 A1 | * | 5/1984 | .............. F16L 27/06 |
| FR | | 78055 E | * | 6/1962 | .............. F16L 27/06 |
| JP | | 5887843 B2 | | 9/2014 | |

*Primary Examiner* — David Bochna
(74) *Attorney, Agent, or Firm* — Dority & Manning, P.A.

(57) ABSTRACT

A slip joint assembly for joining multiple pipes is provided. The slip joint assembly includes a flow expander that is connected to a downstream pipe and is tapered toward a forward end. An inlet bellmouth is coupled to the forward end of the flow expander and defines a flared inlet positioned within an upstream pipe. An annular seal assembly is coupled to the upstream pipe and includes a ball seal positioned around and forming a seal with the flow expander to operably couple the upstream pipe and the downstream pipe. An internal diameter of the annular seal assembly is smaller than a diameter of the flared inlet.

17 Claims, 6 Drawing Sheets

(56) References Cited

U.S. PATENT DOCUMENTS

| | | |
|---|---|---|
| 6,532,730 B2 | 3/2003 | Dean et al. |
| 9,528,442 B2 | 12/2016 | Trinh et al. |
| 2005/0012333 A1 | 1/2005 | Baich et al. |
| 2010/0320752 A1* | 12/2010 | Alstad ............. F16L 27/06 285/265 |
| 2015/0338003 A1* | 11/2015 | Saito ............... F16L 27/04 285/261 |

* cited by examiner

SLIP JOINT ASSEMBLY

FEDERAL RESEARCH STATEMENT

This invention was made with Government support under Contract No. FA8650-09-D-2922, awarded by the U.S. Department of Defense. The Government has certain rights in the invention.

FIELD

The present subject matter relates generally to slip joint assemblies for joining section of pipe, and more specifically, to improved slip joint assemblies for accommodating thermal expansion and reducing thrust loads.

BACKGROUND

A gas turbine engine generally includes a fan and a core arranged in flow communication with one another. Additionally, the core of the gas turbine engine general includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere.

It is often desirable to route compressed air from one section of the engine to another. For example, a cooled cooling air (CCA) heat exchanger system may be used to cool compressed air bled off the compressor section of the engine prior to providing the cooled, compressed air to cool other engine components. Piping systems used to route such air may experience temperature gradients that cause thermal growth mismatches between sections of pipe. To reduce thermally induced stresses between the pipe sections and ensure proper system operation, slip joints may be used to allow adjacent sections of pipe to move relative to each other.

Conventional slip joints in pressurized piping systems experience thrust loads between the pipes that they join. In general, a larger pipe diameter at the slip joint results in a greater surface area for the fluid pressure to act on and thus a greater resulting thrust load. Reducing the slip joint diameter reduces the resultant thrust load, but smaller diameter pipes can also constrict the flow and cause an undesirable pressure drop.

Certain piping systems accommodate thermal expansion and thrust loads between sections of pipe by using larger slip joints or by using different types of joints such as bellows expansion joints. Alternatively, slip joints may be avoided altogether by routing a single pipe such that it is allowed to bend or flex. However, all these options are larger, heavier, and/or cause greater blockage to a fluid flowing around the piping system.

Accordingly, a piping system with features for improved accommodation of thermal growth would be useful. More specifically, a slip joint assembly that accommodates thermal growth and reduces thrust loads within a piping system would be particularly beneficial.

BRIEF DESCRIPTION

Aspects and advantages of the invention will be set forth in part in the following description, or may be obvious from the description, or may be learned through practice of the invention.

In one exemplary embodiment of the present disclosure, a slip joint assembly for joining an upstream pipe and a downstream pipe is provided. The slip joint assembly includes a flow expander having a forward end and an aft end, the flow expander being coupled to the downstream pipe at the aft end and being tapered toward the forward end. An inlet bellmouth is coupled to the forward end of the flow expander, the inlet bellmouth including a flared inlet positioned within the upstream pipe and defining a bellmouth diameter. An annular seal assembly is coupled to the upstream pipe and being positioned around the flow expander to operably couple the upstream pipe and the downstream pipe, the annular seal assembly defining an internal diameter that is smaller than the bellmouth diameter.

In another exemplary embodiment of the present disclosure, a method of assembling a slip joint is provided. The method includes joining a downstream pipe with a flow expander, the flow expander having a tapered forward end and an aft end joined to the downstream pipe. The method further includes sliding an annular seal assembly over the tapered forward end of the flow expander and joining an inlet bellmouth with the flow expander, the inlet bellmouth defining a forward end having a flared inlet and an aft end joined to the tapered forward end of the flow expander. The method further includes joining an upstream pipe to the annular seal assembly, the inlet bellmouth being at least partially received within the upstream pipe.

In still another exemplary embodiment of the present disclosure, a slip joint assembly for joining a first pipe and a second pipe is provided. The slip joint assembly includes a flow expander having a first end and a second end, the flow expander being coupled to the second pipe at the second end and being tapered toward the first end. A bellmouth is coupled to the first end of the flow expander and positioned within the first pipe, the bellmouth defining a flared mouth defining a bellmouth diameter. An annular seal assembly includes a seal housing coupled to the first pipe and defining a spherical seat, a ball seal positioned within the seal housing and defining a spherical surface for engaging the spherical seat, the ball seal defining a radially inner portion having an internal diameter that is smaller than the bellmouth diameter, and a circumferential seal extending around the radially inner portion of the ball seal, the circumferential seal forming a fluid seal between the ball seal and the flow expander.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
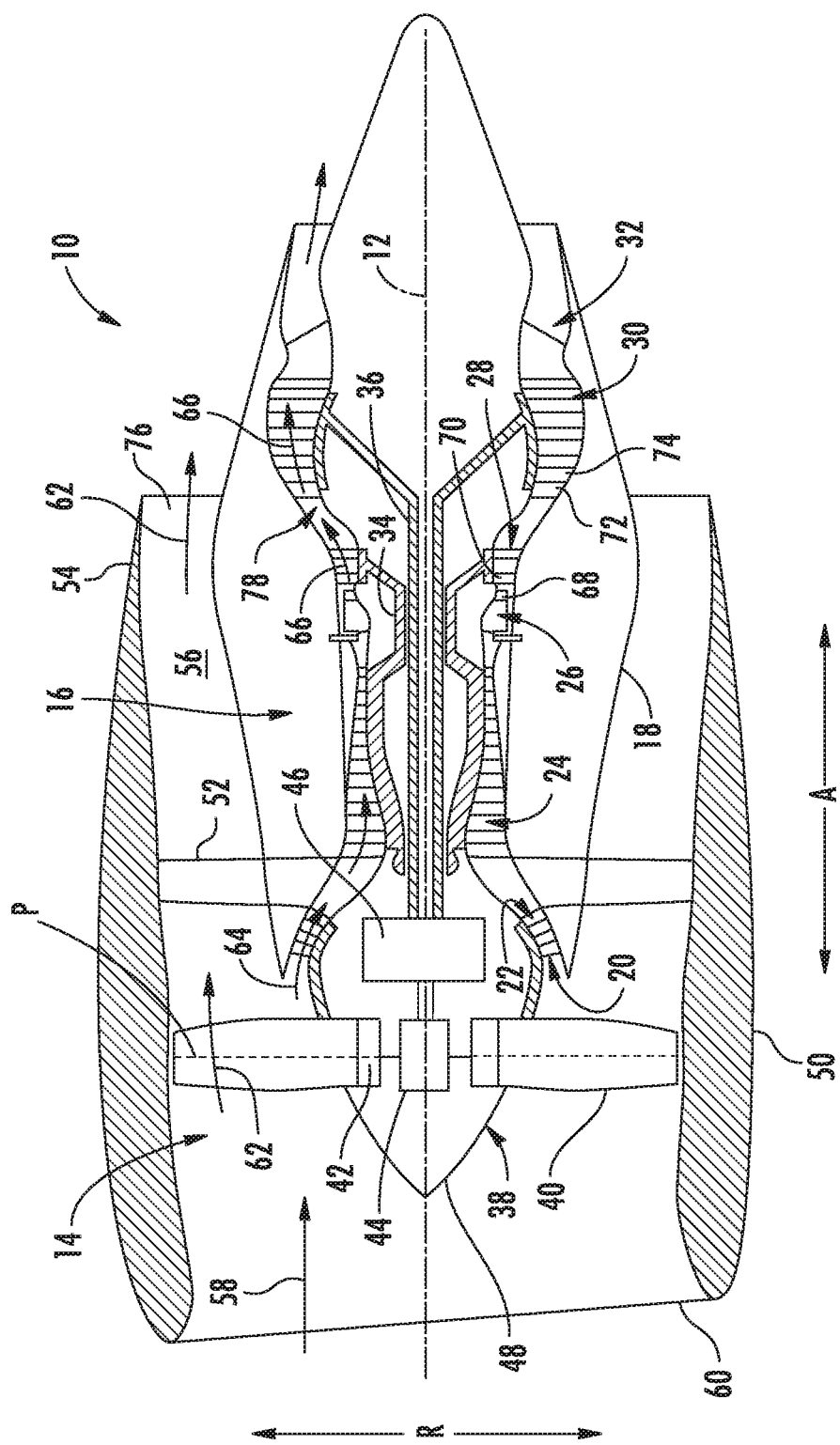
FIG. 1 is a schematic cross-sectional view of an exemplary gas turbine engine according to various embodiments of the present subject matter.
Figure 2:
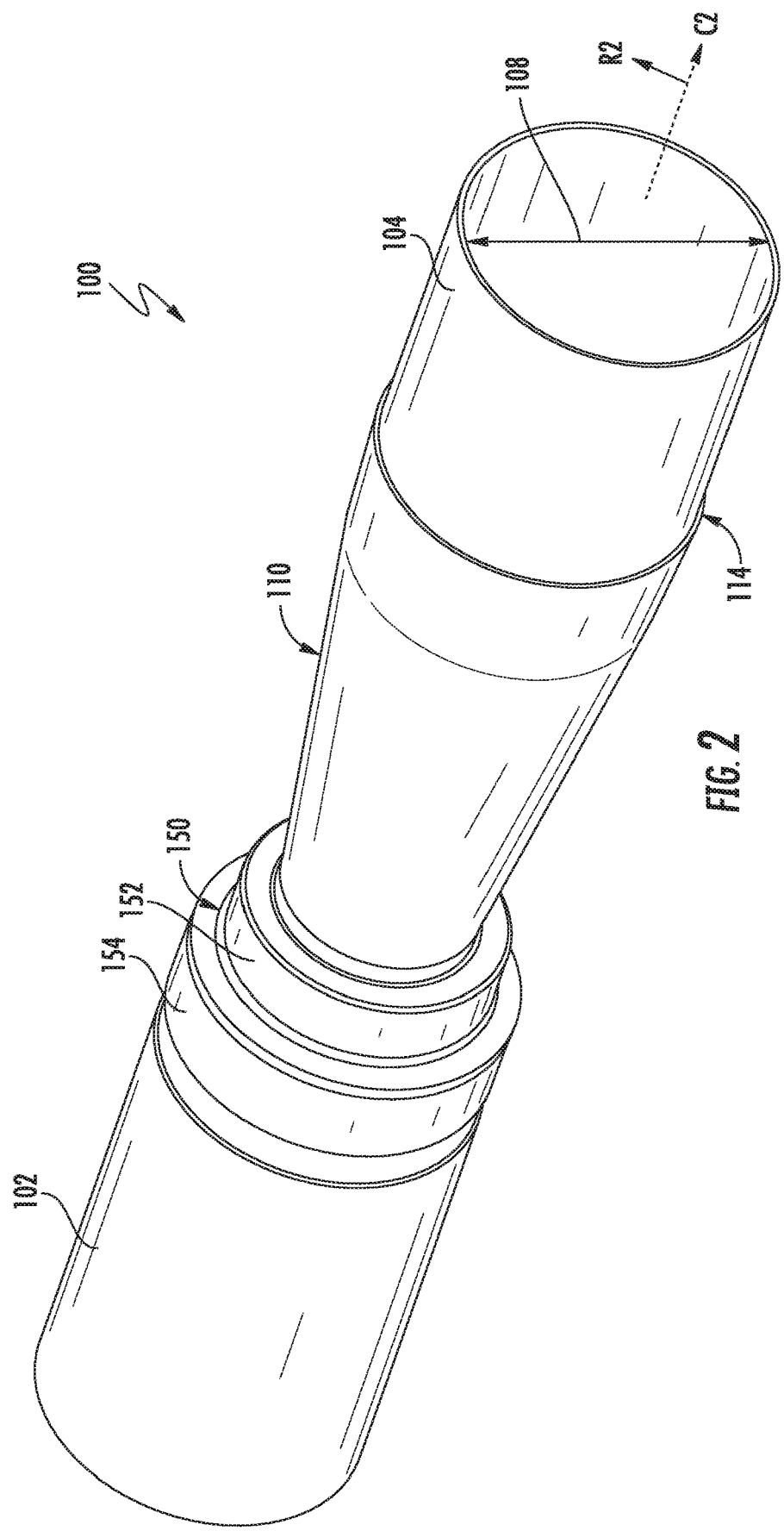
FIG. 2 is a perspective view of a slip joint assembly according to an exemplary embodiment of the present subject matter.
Figure 3:
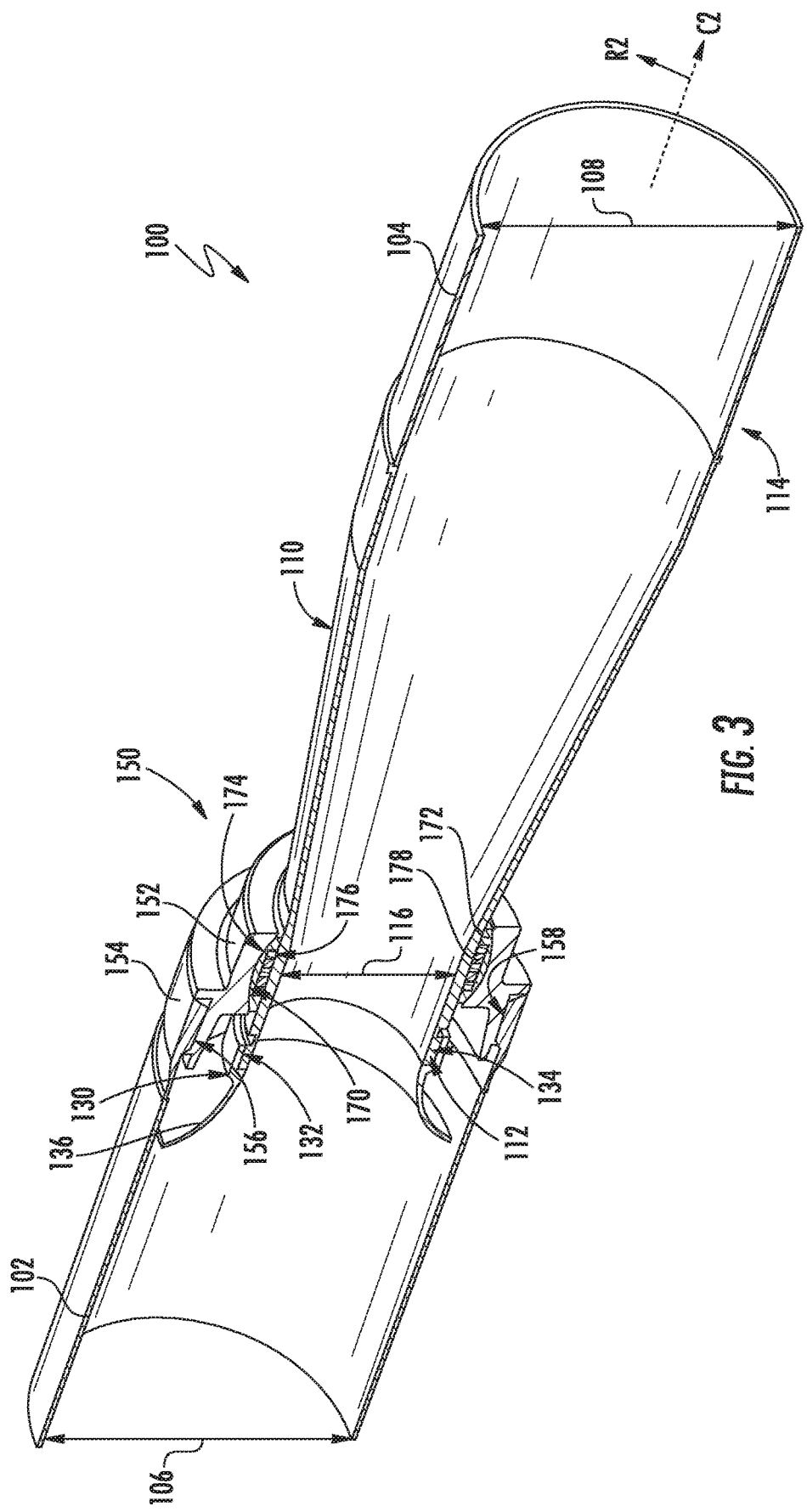
FIG. 3 is a perspective, cross-sectional view of the exemplary slip joint assembly of FIG. 2.
Figure 4:
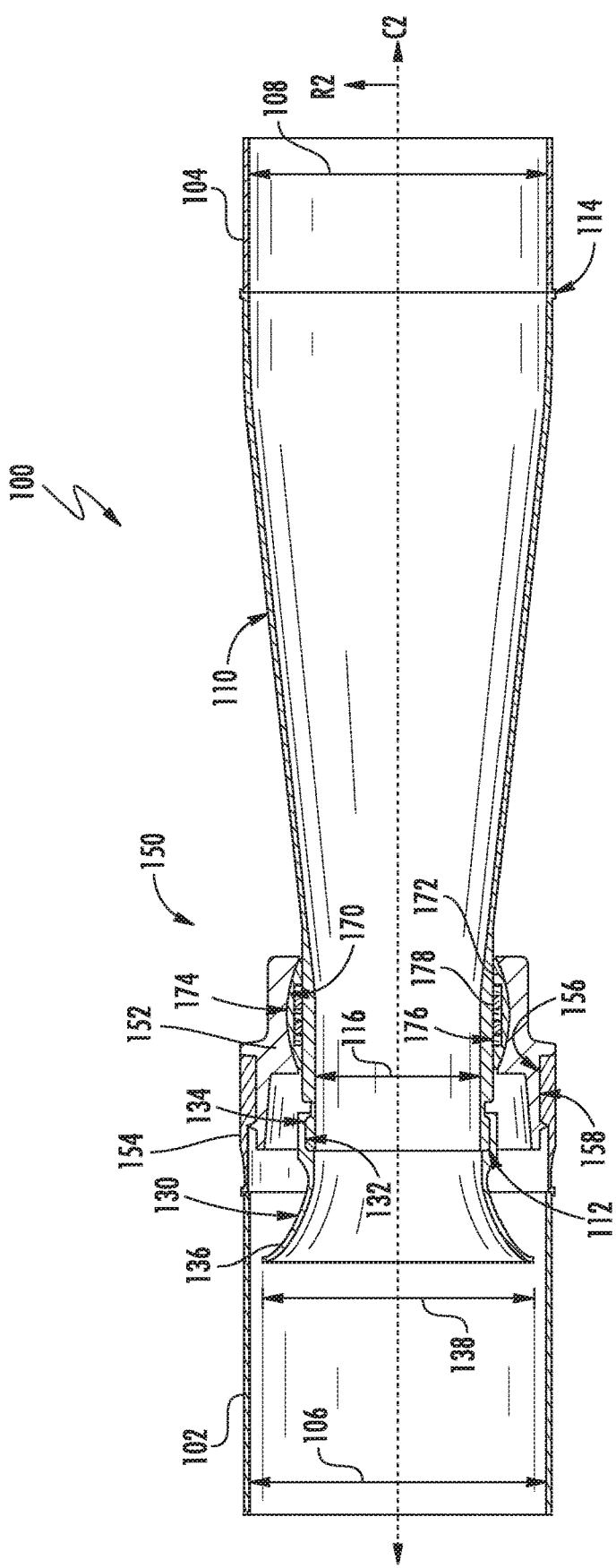
FIG. 4 is a side, cross-sectional view of the exemplary slip joint assembly of FIG. 2.
Figure 5:
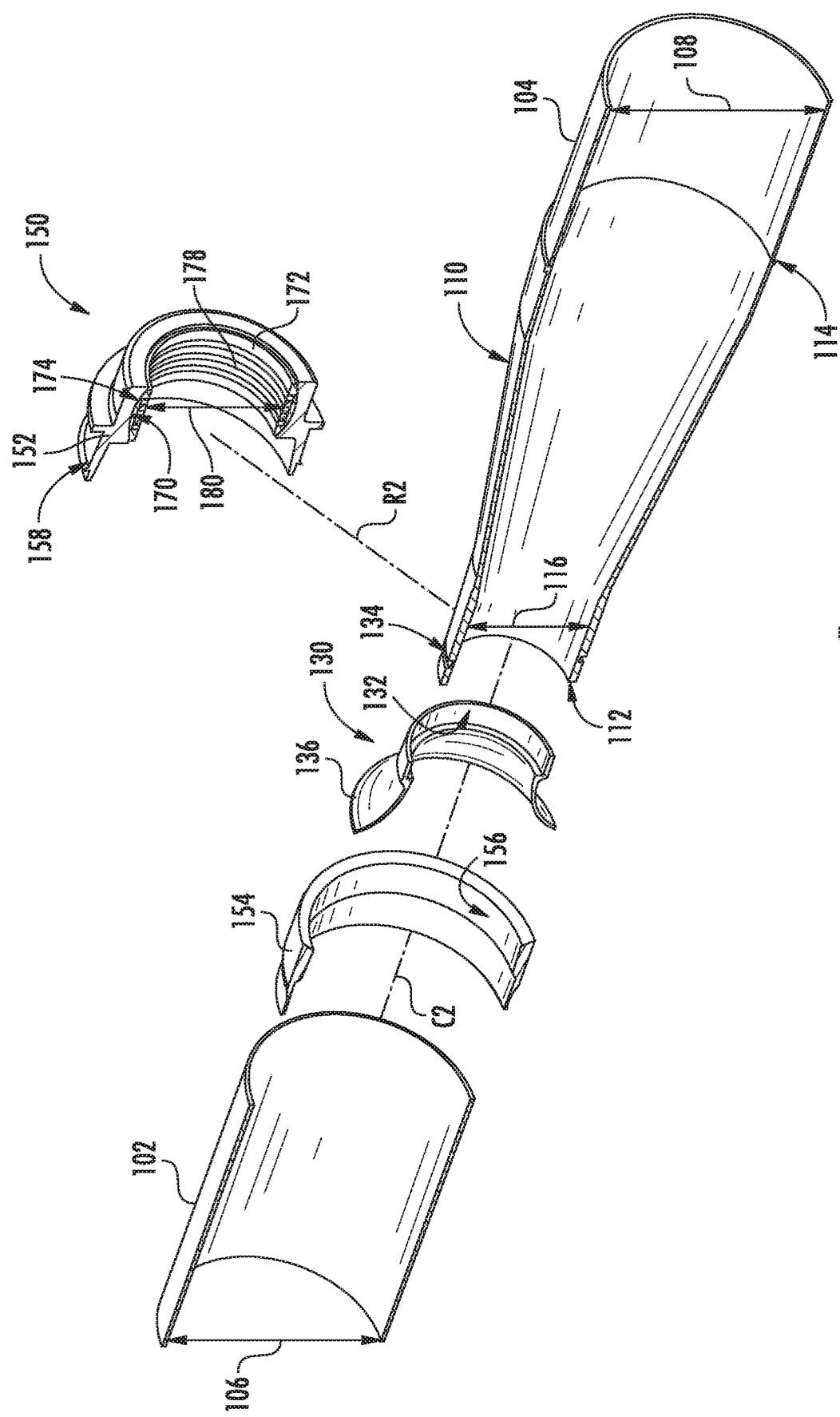
FIG. 5 is an exploded, cross-sectional view of the exemplary slip joint assembly of FIG. 2.

Repeat use of reference characters in the present specification and drawings is intended to represent the same or analogous features or elements of the present invention.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "forward" and "aft" refer to relative positions within a gas turbine engine, with forward referring to a position closer to an engine inlet and aft referring to a position closer to an engine nozzle or exhaust. The terms "upstream" and "downstream" refer to the relative direction with respect to fluid flow in a fluid pathway. For example, "upstream" refers to the direction from which the fluid flows, and "downstream" refers to the direction to which the fluid flows.

The present disclosure is generally directed to a slip joint assembly for joining multiple pipes. The slip joint assembly includes a flow expander that is connected to a downstream pipe and is tapered toward a forward end. An inlet bellmouth is coupled to the forward end of the flow expander and defines a flared inlet positioned within an upstream pipe. An annular seal assembly is coupled to the upstream pipe and includes a ball seal positioned around and forming a seal with the flow expander to operably couple the upstream pipe and the downstream pipe. An internal diameter of the annular seal assembly is smaller than a diameter of the flared inlet.

Referring now to the drawings, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline or central axis 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustor or combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across a power gear box 46. The power gear box 46 includes a plurality of gears for stepping down the rotational speed of the LP shaft 36 to a more efficient rotational fan speed.

Referring still to the exemplary embodiment of FIG. 1, the disk 42 is covered by rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that the nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It should be appreciated that the exemplary turbofan 10 depicted in FIG. 1 is by way of example only and that in other exemplary embodiments, turbofan 10 may have any other suitable configuration. For example, it should be appreciated that in other exemplary embodiments, turbofan 10 may instead be configured as any other suitable turbine engine, such as a turboprop engine, turbojet engine, internal combustion engine, etc.

Referring now generally to FIGS. 2 through 5, a slip joint assembly 100 in accordance with an exemplary embodiment of the present disclosure is provided. For example, slip joint assembly 100 may be positioned within turbofan 10 for routing compressed air from compressor section (e.g., HP compressor 24) to a cooled cooling air (CCA) heat exchanger. Notably, FIGS. 2 through 5 illustrate only portions of slip joint assembly 100 and its associated piping system for the purpose of explaining aspects of the present subject matter, while other components may be removed for clarity. In addition, slip joint assembly 100 is only one exemplary slip joint assembly and other types and configurations of slip joints may be used according to alternative embodiments. Moreover, aspects of the present subject matter can be used to join pipes for any purpose and in any application. The embodiments and applications described herein are not intended to be limiting.

As explained briefly above, thermal growth within a piping system may introduce undesirable stresses between sections of pipe. More specifically, because sections of pipe may be attached to different portions of turbofan engine 10, may be constructed of materials having different coefficients of thermal expansion, and may be exposed to different temperatures, thermal expansion can cause significant relative movement between the sections of pipe. Accordingly, slip joint assembly 100 may be used to accommodate relative thermal expansion to reduce potential stresses while ensuring operability of piping system.

As illustrated in FIGS. 2 through 5, slip joint assembly 100 is generally configured for joining or operably coupling two pipes or two sections of pipe. More specifically, slip joint assembly 100 joins a first pipe or upstream pipe 102 with a second pipe or downstream pipe 104. In this manner, upstream pipe 102 and downstream pipe 104 are in fluid communication through slip joint assembly 100 such that a fluid may flow from upstream pipe 102 through to downstream pipe 104. In general, slip joint assembly 100 defines an axial direction or centerline direction C2 and a radial direction R2 perpendicular to the centerline direction C2. Continuing the example from above, upstream pipe 102 could be directly coupled to compressor section (e.g., HP compressor 24) of turbofan 10 and downstream pipe 104 could be directly coupled to a heat exchanger, such as a cooled cooling air (CCA) heat exchanger.

Upstream pipe 102 and downstream pipe 104 are generally tubular or have substantially circular cross-sectional profiles. In addition, upstream pipe 102 defines an internal diameter or upstream diameter 106 and downstream pipe 104 defines an internal diameter or downstream diameter 108. According to the illustrated embodiment, upstream diameter 106 is substantially equivalent to downstream diameter 108. It should be appreciated, that as used herein, terms of approximation, such as "approximately," "substantially," or "about," refer to being within a ten percent margin of error. However, according to alternative embodiments, slip joint assembly 100 may be used to change a diameter of piping system, e.g., from a smaller upstream diameter to a larger downstream diameter or from a larger upstream diameter to a smaller downstream diameter while remaining within the scope of the present subject matter.

Although the exemplary embodiment is described herein as passing a flow of fluid from upstream pipe 102 to downstream pipe 104, this is only an exemplary embodiment and is not intended to limit the scope of the present subject matter. For example, the pipe sections or fluid flow direction could be reversed according to alternative embodiments. In addition, aspects of the present subject matter need not be limited to use in the aviation industry or to gas turbine engines, but could instead be used to flexibly join any pipe sections in any given application, in any given industry, for any specific purpose.

According to the illustrated embodiment, slip joint assembly 100 includes a flow expander 110 having a forward end 112 and an aft end 114. Flow expander 110 is coupled to downstream pipe 104 at aft end 114 and is tapered toward forward end 112. Downstream pipe 104 and flow expander 110 may be coupled in any suitable manner. For example, the joint between the downstream pipe 104 and flow expander 110 may be formed by welding, by using a threaded engagement, or using any other suitable coupling mechanism. Alternatively, downstream pipe 104 and flow expander 110 can be integrally formed, e.g., using a single extrusion process or using other post-processing means to taper flow expander 110.

As illustrated, flow expander 110 has an upstream section and a downstream section coupled by a tapered section. The downstream section of flow expander 110 has a diameter substantially equivalent to downstream diameter 108, e.g., to simplify joining of the flow expander 110 and downstream pipe 108. By contrast, the upstream section of flow expander has a reduced diameter 116 (see FIG. 5). The tapered section is positioned between the upstream and downstream sections of flow expander 110 to expand the diameter from the reduced diameter 116 to the downstream diameter 108. According to the illustrated embodiment, the tapered section of flow expander 110 has a substantially linear taper. However, according to alternative embodiments, flow expander 110 could have a non-linear taper such as a parabolic taper or any other suitable shape for reducing pressure losses within a flow of fluid.

Slip joint assembly 100 further includes an inlet bellmouth 130 coupled to forward end 112 of flow expander 110. According to the illustrated embodiment, inlet bellmouth 130 defines a threaded flange 132 for engaging a complementary threaded portion 134 of forward end 112 of flow expander 110. However, according to alternative embodiments, any detachable coupling means may be used to connect inlet bellmouth 130 to flow expander 110. Inlet bellmouth 130 includes a flared inlet 136 positioned opposite threaded portion 132 along the centerline direction C2, e.g., in the upstream direction. In this regard, flared inlet 136 defines a bellmouth diameter 138 that is greater than reduced diameter 116 of flow expander 110. According to the illustrated embodiment, flared inlet 136 has a generally parabolic profile to facilitate the merging or constriction of the flow of fluid passing through upstream pipe 102 into inlet bellmouth 130. However, according to alternative embodiments, flared inlet 136 may define any suitable shape or profile.

Slip joint assembly 100 further includes an annular seal assembly 150 coupled to upstream pipe 102 and being positioned around flow expander 110 to operably couple upstream pipe 102 and downstream pipe 104. In this regard, for example, annular seal assembly 100 includes a seal housing 152 that is coupled to upstream pipe 102. According to the illustrated embodiment, upstream pipe 102 and seal housing 152 are coupled through an upstream adapter 154. Upstream adapter 154 may be joined with upstream pipe 102 in any suitable manner described herein, e.g., welding, threaded connection, or another suitable mechanical joint. As illustrated, upstream adapter 154 is welded or otherwise permanently fixed to upstream pipe 102 and defines upstream pipe threads 156 for engaging complementary seal housing threads 158 on seal housing 150.

Seal housing 152 further defines a spherical seat 170 on a radially inner portion of seal housing 152. In addition, annular seal assembly 150 includes a ball seal 172 that defines a spherical surface 174 for engaging spherical seat 170. In this manner, ball seal 172 is positioned within seal housing 152 such that spherical seat 170 and spherical surface 174 are in fluid tight engagement to prevent fluid leaks while allowing ball seal 172 to pivot relative to seal housing 152.

Ball seal 172 defines a central bore through which flow expander 110 is received. Ball seal further defines a radially inner portion 176 that defines the central bore and is configured for receiving a circumferential seal 178. Circumferential seal 178 extends around radially inner portion 176 of ball seal 172 and forms a fluid seal between ball seal 172 and flow expander 110. Circumferential seal 178 may be one or more O-rings, a resilient rubber member, or any other suitable sealing mechanism.

According to the illustrated embodiment, annular seal assembly 150, or more specifically, circumferential seal 178, defines an internal diameter 180 (see FIG. 5) that is substantially equivalent to reduced diameter 116 of flow expander 110 and is smaller than bellmouth diameter 138. In this manner, upstream pipe 104 is at least partially axially restrained relative to downstream pipe 104. More specifically, slip joint assembly 100 allows upstream pipe 102 and downstream pipe 104 to slide relative to each other without decoupling completely or breaking the fluid seal (e.g., formed by circumferential seal 178) between the two pipes through flow expander 110. In addition, the interface between seal housing 152 and ball seal 172 enables some misalignment between upstream pipe 102 and downstream pipe 104. More specifically, because spherical surface 174 can pivot relative to spherical seat 170, upstream pipe 102 and downstream pipe 104 may pivot relative to centerline direction C2 of slip joint assembly 100.

As described in more detail below, to assemble slip joint assembly 100, flow expander 110 is coupled to downstream pipe 104 and annular seal assembly 150 slides over the forward end 112 of flow expander 110 that defines reduced diameter 116. Inlet bellmouth 130 is then coupled to forward end 112 of flow expander 110 and inlet bellmouth 130 slides into upstream pipe 102. Upstream pipe 102 is joined within annular seal assembly 150, e.g., via threaded engagement with seal housing 152. In this manner, upstream pipe 102 and downstream pipe 104 are flexibly coupled in a fluid tight manner to allow axial movement and angular misalignment between upstream pipe 102 and downstream pipe 104. According to the illustrated embodiment, inlet bellmouth 130 is positioned entirely within upstream pipe 102 and the bellmouth diameter 138 is nearly equivalent to the upstream diameter 106 but enough gap between the diameters is maintained to permit angular misalignment of the pipes 102, 104. In this manner, all of the flow of fluid in upstream pipe 102 is captured and converged through inlet bellmouth 130 into downstream pipe 104.

Now that the construction and configuration of slip joint assembly according to an exemplary embodiment of the present subject matter has been presented, an exemplary method 200 for assembling a slip joint according to an exemplary embodiment of the present subject matter is provided. Method 200 can be used to assemble slip joint assembly 100, or any other suitable slip joint assembly. However, it should be appreciated that the exemplary method 200 is discussed herein only to describe exemplary aspects of the present subject matter, and is not intended to be limiting.

Figure 6:
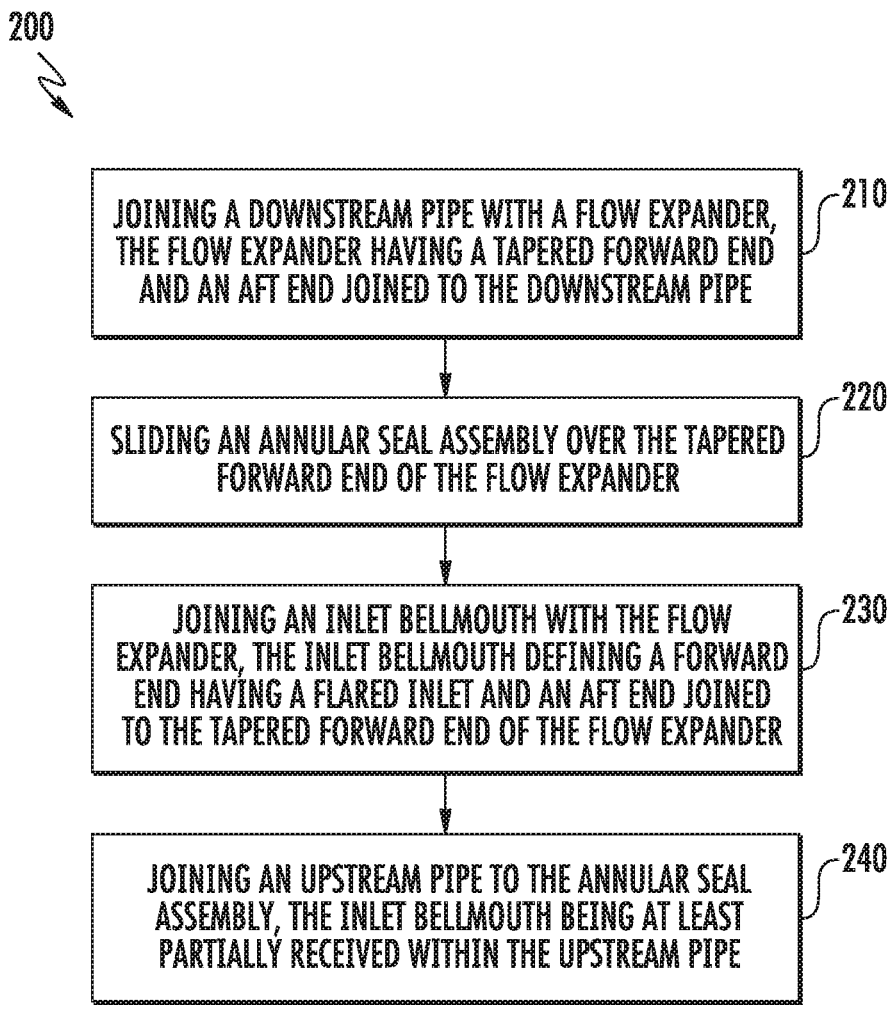
FIG. 6 is a method of assembling a slip joint according to an exemplary embodiment of the present subject matter.

Referring now to FIG. 6, method 200 includes, at step 210, joining a downstream pipe with a flow expander, the flow expander having a tapered forward end and an aft end joined to the downstream pipe. For example, using slip joint assembly 100 as an example, downstream pipe 104 and flow expander 110 may be joined using a threaded connection, by welding, or may be integrally formed.

Method 200 further includes, at step 220, sliding an annular seal assembly over the tapered forward end of the flow expander. According to an exemplary embodiment, the annular seal assembly may include a seal housing defining a spherical seat and a ball seal positioned within the seal housing. The ball seal may define a spherical surface for engaging the spherical seat and a radially inner portion. A circumferential seal may extend around the radially inner portion of the ball seal for forming a fluid seal between the ball seal and the flow expander.

Method 200 further includes, at step 230, joining an inlet bellmouth with the flow expander, the inlet bellmouth defining a forward end having a flared inlet and an aft end joined to the tapered forward end of the flow expander. Method 200 further includes, at step 240, joining an upstream pipe to the annular seal assembly, the inlet bellmouth being at least partially received within the upstream pipe. The joint between the inlet bellmouth and the flow expander and the joint between the annular seal assembly and the upstream pipe may be threaded joints, welded joints, or any other suitable mechanical connections. According to an exemplary embodiment, the annular seal assembly defines an internal diameter and the bellmouth defines a bellmouth diameter at the flared inlet, wherein the internal diameter is less than the bellmouth diameter. In this manner, a secure slip joint is formed allowing axial and angular motion while reducing thrust loads and simplifying assembly.

The exemplary slip joint and method of joining pipes described above provide an effective means for accommodating thermal expansion between sections of a piping system by allowing relative movement between sections of pipe. In addition by minimizing the diameter of the pipes at the slip joint, thrust loads experienced by the pipes are minimized. An inlet bellmouth and flow expander are included to minimize the pressure drop resulting from the flow constriction caused by the reduced diameter pipes and slip joint. The slip joint assembly is easy to assemble, requires less space than alternative joints, reduces thrust loading, and reduces a pressure drop of a fluid flowing through the slip joint. Although the exemplary slip joint is described as being used in a gas turbine engine, it should be appreciated that aspects of the present subject matter may be used to join pipes within any piping system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A slip joint assembly for joining an upstream pipe and a downstream pipe, the slip joint assembly comprising:
    a flow expander having a forward end and an aft end, the flow expander being coupled to the downstream pipe at the aft end and being tapered toward the forward end;
    an inlet bellmouth coupled to the forward end of the flow expander, the inlet bellmouth comprising a flared inlet positioned within the upstream pipe and defining a bellmouth diameter; and
    an annular seal assembly coupled to the upstream pipe and being positioned around the flow expander to operably couple the upstream pipe and the downstream pipe, the annular seal assembly defining an internal diameter that is smaller than the bellmouth diameter, wherein the annular seal assembly comprises:
        a seal housing defining a spherical seat;
        a ball seal positioned within the seal housing and defining a spherical surface for engaging the spherical seat, the ball seal defining a radially inner portion; and
        a circumferential seal extending around the radially inner portion of the ball seal, the circumferential seal forming a fluid seal between the ball seal and the flow expander.

2. The slip joint assembly of claim 1, wherein the upstream pipe and the seal housing are in threaded engagement.

3. The slip joint assembly of claim 1, wherein the inlet bellmouth and the flow expander are in threaded engagement.

4. The slip joint assembly of claim 1, wherein the upstream pipe defines an upstream diameter and the downstream pipe defines a downstream diameter, the upstream diameter being substantially equivalent to the downstream diameter.

5. The slip joint assembly of claim 4, wherein an outer diameter of the seal housing is less than or equal to the upstream diameter of the upstream pipe.

6. The slip joint assembly of claim 1, wherein the inlet bellmouth is positioned entirely within the upstream pipe.

7. The slip joint assembly of claim 1, wherein the slip joint assembly enables the upstream pipe to move along an axial direction relative to the downstream pipe and enables angular misalignment between the upstream pipe and the downstream pipe.

8. The slip joint assembly of claim 1, wherein the flow expander is welded to the downstream pipe.

9. The slip joint assembly of claim 1, wherein the flow expander is integrally formed with the downstream pipe.

10. The slip joint assembly of claim 1, wherein the upstream pipe is directly coupled to a compressor section of a gas turbine engine.

11. A method of assembling a slip joint, the method comprising:
    joining a downstream pipe with a flow expander, the flow expander having a tapered forward end and an aft end joined to the downstream pipe;
    sliding an annular seal assembly over the tapered forward end of the flow expander;
    joining an inlet bellmouth with the flow expander by threading or welding the inlet bellmouth onto the flow expander, the inlet bellmouth defining a forward end having a flared inlet and an aft end joined to the tapered forward end of the flow expander; and
    joining an upstream pipe to the annular seal assembly, the inlet bellmouth being at least partially received within the upstream pipe.

12. The method of claim 11, wherein the annular seal assembly comprises:
    a seal housing defining a spherical seat;
    a ball seal positioned within the seal housing and defining a spherical surface for engaging the spherical seat, the ball seal defining a radially inner portion; and
    a circumferential seal extending around the radially inner portion of the ball seal, the circumferential seal forming a fluid seal between the ball seal and the flow expander.

13. The method of claim 12, wherein joining the upstream pipe and the annular seal assembly comprises threading the upstream pipe onto the seal housing.

14. The method of claim 11, wherein the upstream pipe is directly coupled to a compressor section of a gas turbine engine.

15. A slip joint assembly for joining a first pipe and a second pipe, the slip joint assembly comprising:
    a flow expander having a first end and a second end, the flow expander being coupled to the second pipe at the second end and being tapered toward the first end;
    a bellmouth coupled to the first end of the flow expander and positioned within the first pipe, the bellmouth defining a flared mouth defining a bellmouth diameter; and
    an annular seal assembly comprising:
        a seal housing coupled to the first pipe and defining a spherical seat;
        a ball seal positioned within the seal housing and defining a spherical surface for engaging the spherical seat, the ball seal defining a radially inner portion having an internal diameter that is smaller than the bellmouth diameter; and
        a circumferential seal extending around the radially inner portion of the ball seal, the circumferential seal forming a fluid seal between the ball seal and the flow expander.

16. The slip joint assembly of claim 15, wherein the first pipe is positioned upstream of the second pipe.

17. The slip joint assembly of claim 15, wherein the first pipe is directly coupled to a compressor section of a gas turbine engine.

* * * * *